United States Patent [19]
Hendrix

[11] Patent Number: 5,737,850
[45] Date of Patent: Apr. 14, 1998

[54] METHOD AND APPARATUS FOR DRYING POULTRY MANURE

[75] Inventor: Bryan Hendrix, Seymour, Ind.

[73] Assignee: Rose Acre Farms, Inc., Seymour, Ind.

[21] Appl. No.: 741,681

[22] Filed: Oct. 31, 1996

[51] Int. Cl.[6] .................................................. C26B 7/00
[52] U.S. Cl. .......................... 34/380; 34/432; 34/85; 34/173; 34/181; 34/206; 119/442
[58] Field of Search ................................ 34/302, 304, 380, 34/427, 428, 429, 432, 443, 482, 487, 498, 85, 166, 168, 173, 179, 181, 182, 206, 236; 119/442, 443, 451, 458, 479, 527; 198/396, 582, 616

[56] References Cited

U.S. PATENT DOCUMENTS

| | | | |
|---|---|---|---|
| 2,663,555 | 12/1953 | Milliken | 259/144 |
| 3,062,184 | 11/1962 | Bayer | 119/22 |
| 3,385,266 | 5/1968 | Launder et al. | 119/22 |
| 3,693,782 | 9/1972 | Thoennes | 198/224 |
| 3,697,056 | 10/1972 | Prins, Sr. et al. | 263/8 R |
| 3,783,829 | 1/1974 | Siciliano | 119/455 |
| 4,023,531 | 5/1977 | Thompson | 119/22 |
| 4,123,992 | 11/1978 | Laurenz | 119/16 |
| 4,357,904 | 11/1982 | Kuhlmann | 119/22 |
| 4,697,548 | 10/1987 | Malestein | 119/22 |
| 4,706,607 | 11/1987 | Ijichi et al. | 119/16 |
| 4,708,294 | 11/1987 | Endom | 241/27 |
| 4,936,257 | 6/1990 | Kuhlmann | 119/22 |
| 5,487,226 | 1/1996 | Hoover | 34/503 |

*Primary Examiner*—John M. Sollecito
*Assistant Examiner*—Steve Gravini
*Attorney, Agent, or Firm*—Woodard, Emhardt, Naughton Moriarty & McNett

[57] ABSTRACT

A chicken manure drying system is placed in a hen house. A platform of the system is disposed underneath a plurality of chicken cages. As chicken manure drops from the chicken cages, it collects on the platform. Drying fans of the system are disposed adjacent to the platform. The drying fans provide a constant flow of air over the chicken manure so as to dry the chicken manure. The plowing apparatus of the system includes a plowing device disposed over the platform. The plowing device is periodically moved across the platform in order to plow the chicken manure. The plowing of the chicken manure exposes more of the chicken manure to air. This exposure facilitates the comprehensive and expeditious drying of the chicken manure. After the chicken manure has been sufficiently dried to serve as fertilizer, the chicken manure is conveyed to a collection site.

17 Claims, 5 Drawing Sheets

METHOD AND APPARATUS FOR DRYING POULTRY MANURE

BACKGROUND OF THE INVENTION

1. Field of the Invention

The present invention relates generally to a method and system for drying poultry manure, and more specifically to a method and system for facilitating the comprehensive drying of chicken manure in an expeditious manner. While the present invention was developed for drying chicken manure it is appreciated that it may have application outside of this field.

2. Description of the Prior Art

The use of chicken manure as a fertilizer is common among farmers. Typically, a farmer will use some means to collect the chicken manure and another means to dry the collected chicken manure. The step of drying chicken manure is essential because the moisture percentage of chicken manure ranges from 65% to 75% as the chicken manure leaves the chicken, while chicken manure is generally only suitable as a fertilizer when its moisture percentage is at or below about 45% moisture. Therefore, to enable chicken manure to be used as a fertilizer requires a means for substantially drying the chicken manure.

U.S. Pat. No. 3,385,266 to Launder et al. discloses a manure drying system wherein animals (i.e. chickens) are placed in a longitudinal arrangement of cages so as to drop moist manure on a longitudinal strip of material, the material being a type with the capability to form a compost with the manure. The material is disposed under the cages and over a longitudinal chamber. Air flowing upward from the chamber dries the material and the manure as the material and the manure are slowly advanced over the chamber into a comminuting mechanism. The material and the manure are advanced at a speed designed to ensure that the material and the manure are sufficiently dry prior to reaching the comminuting mechanism.

U.S. Pat. No. 4,936,257 to Kuhlmann discloses a coop arrangement for a poultry farm having a plurality of coops and a plurality of conveyor belts wherein each conveyor belt is disposed below a particular row of coops. As the chickens drop manure on the conveyor belts, the conveyor belts are advanced to a pressing roll where the manure is flatly pressed onto the conveyor belts. The conveyor belts then enter a drying channel where a blower passes air over the manure. The conveyor belts move through the drying channel at a set pace to ensure sufficient drying of the chicken manure.

Many of the prior art chicken manure processing systems suffer from a couple of common undesirable drawbacks. First, too much time may be utilized in sufficiently drying the chicken manure. Second, due to the nature of the process being implemented by the prior art systems, the chicken manure may not be comprehensively dried for failure to expose a substantial portion of the chicken manure to the drying means. Thus, while the overall moisture percentage of the chicken manure is at or below 45%, portions of the chicken manure that was not exposed to air may be above 45% moisture.

Although the prior techniques for drying chicken manure are steps in the right direction, the need for additional improvement still remains. The present invention satisfies this need in a novel and unobvious way.

SUMMARY OF THE INVENTION

One form of the present invention contemplates a chicken manure drying apparatus. The apparatus comprising: a platform for receiving chicken manure thereon; a plowing apparatus positioned over the platform for engaging the chicken manure on the platform; and at least one drying fan disposed adjacent to the platform for directing air across the platform.

Another form of the present invention contemplates a method of drying chicken manure on a platform. The method comprising: collecting chicken manure droppings; blowing air across the chicken manure droppings; periodically plowing the chicken manure; and conveying the chicken manure droppings from the platform after the chicken manure has been sufficiently dried to serve as fertilizer.

One object of the present invention is to provide an improved method and apparatus for drying manure.

Related objects and advantages of the present invention will be apparent from the following description.

DESCRIPTION OF THE PREFERRED EMBODIMENT

Figure 1:
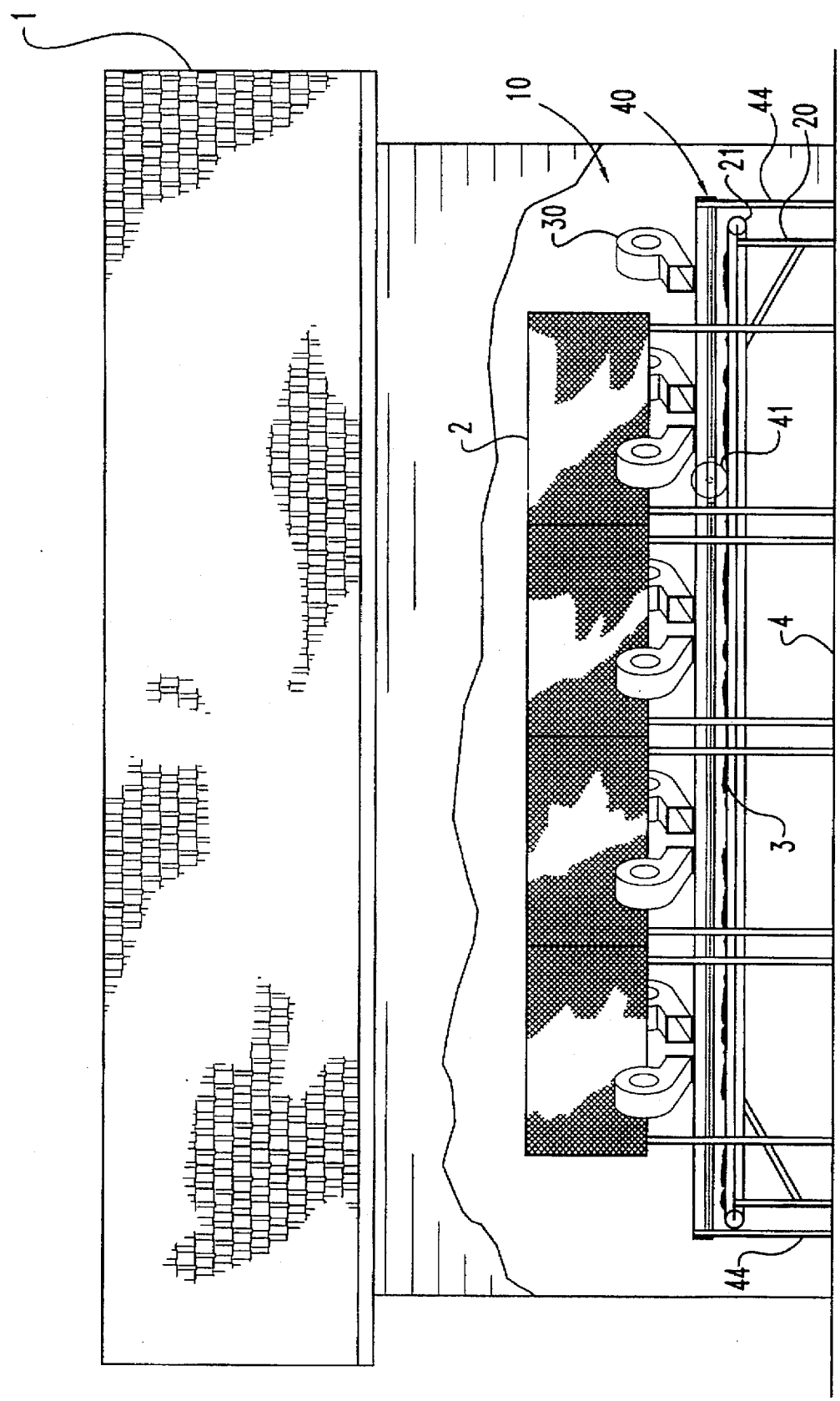
FIG. 1 is an illustrative side elevational view of one embodiment of the present invention located within a hen house.

For the purposes of promoting an understanding of the principles of the present invention, reference will now be made to the preferred embodiments illustrated in the drawings and specific language will be used to describe the same. It will nevertheless be understood that no limitation of the scope of the invention is thereby intended, such alterations and further modifications in the illustrated system, and such further applications of the principles of the present invention as illustrated therein being contemplated as would normally occur to one skilled in the art to which the present invention relates.

Figure 2:
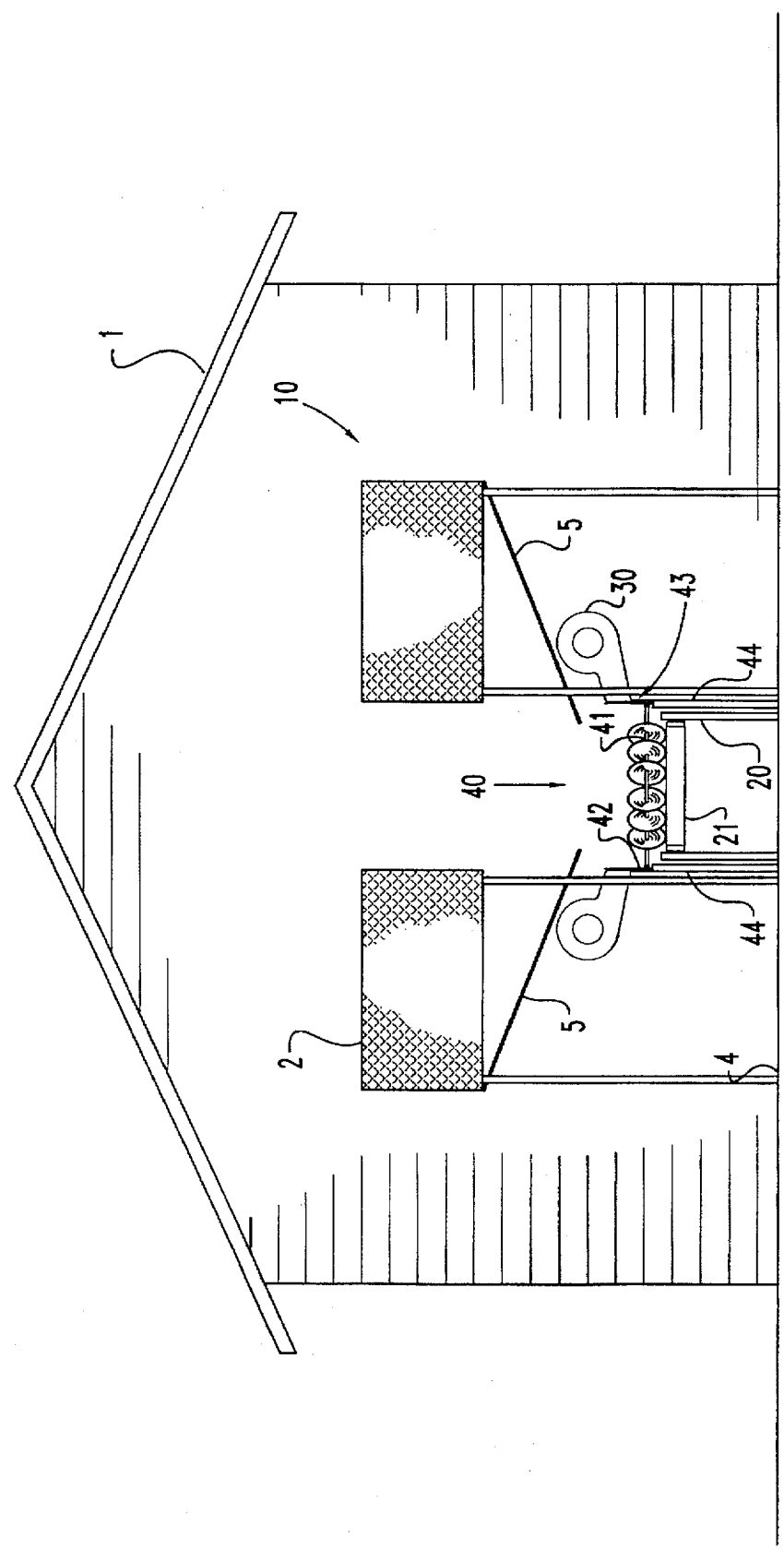
FIG. 2 is an end view of the present invention of FIG. 1.

In accordance with the present invention, FIG. 1 is a side view of a poultry manure drying apparatus 10, and FIG. 2. is a front view of chicken manure drying apparatus 10. Poultry includes chickens, turkeys and other game/egg laying birds raised by modern farmers. In the preferred embodiment the present invention is designed and constructed for drying chicken manure. Referring to FIG. 2, apparatus 10 comprises a platform 20, a plurality of drying fans 30 disposed along the side of platform 20, and a plowing apparatus 40 having a plowing device 41 disposed over platform 20. In the preferred embodiment the plurality of fans 30 are designed to deliver an air flow of 300–500 surface cubic feet per minute. It is understood that other flow rates for fans 30 are contemplated herein. Further, other types of air handling equipment are contemplated herein for moving a quantity of air across the chicken manure.

Preferably the chicken manure drying apparatus 10 is located in a hen house 1, and is disposed under one or a plurality of chicken cages 2 in order to compile/collect the chicken manure droppings 3 discharged from the birds in cages 2 onto the platform 20. However, the present invention contemplates that chicken manure drying apparatus 10 can be disposed in a variety of locations relative to cages 2 and that any other means may be utilized to accumulate the chicken manure droppings 3 on platform 20. The apparatus 10 is disposed under cages 2, and each row of cages 2 having a chute 5 for directing the chicken manure droppings 3 onto platform 20.

With particular reference to FIG. 1, as the chicken manure droppings 3 collect on platform 20, the drying fans 30 blow a substantial quantity of air over the chicken manure droppings. In one form of the present invention the platform 20 is about five hundred feet long and the fans 30 are spaced every 50 feet along the platform. In the preferred embodiment the fans are oriented at an angle to the platform to increase the surface area over which the air is blown. In order to comprehensively dry the chicken manure droppings 3, it is important that a substantial portion of the chicken manure droppings 3 be exposed to the moving air from drying fans 30. One or a plurality of plowing devices 41 are utilized to cut and drag, or rotate the chicken manure droppings 3 on platform 20 so that a different surface area of the manure is exposed to the moving air. By periodically moving plowing the device(s) 41 across platform 20, a substantial portion of chicken manure droppings 3 will be exposed to the air. In one form of the present invention furrows of about 3-6 inches are formed in the chicken manure.

With reference to FIG. 2, plowing apparatus 40 includes plowing device 41, a first rail 42, and a second rail 43, wherein plowing device 41 is coupled to both first rail 42 and second rail 43. The present invention contemplates that plowing device 41 can be coupled to both first rail 42 and second rail 43 by any means that will allow plowing device 41 to travel back and forth along first rail 42 and second rail 43. In the present invention the first rail 42 and second rail 43 are coupled to one of the following; platform 20, cages 2, hen house 1, and/or the ground 4. In the preferred embodiment the first rail 42 and the second rail 43 are coupled to the ground 4 by a plurality of legs 44. The plowing device 41 being moved along the rails by a propulsion source, such as, but not intended to be limited in any manner, by a technician. It is believed that propulsion sources sufficient to move the plowing device 41 along rails 42 and 43 are generally known to those of ordinary skill in the art. In one form of the present invention the plowing device 41 is moved across the chicken manure about every 2-4 hours. Other time periods for moving the plowing device across the manure are contemplated herein.

Figure 3:
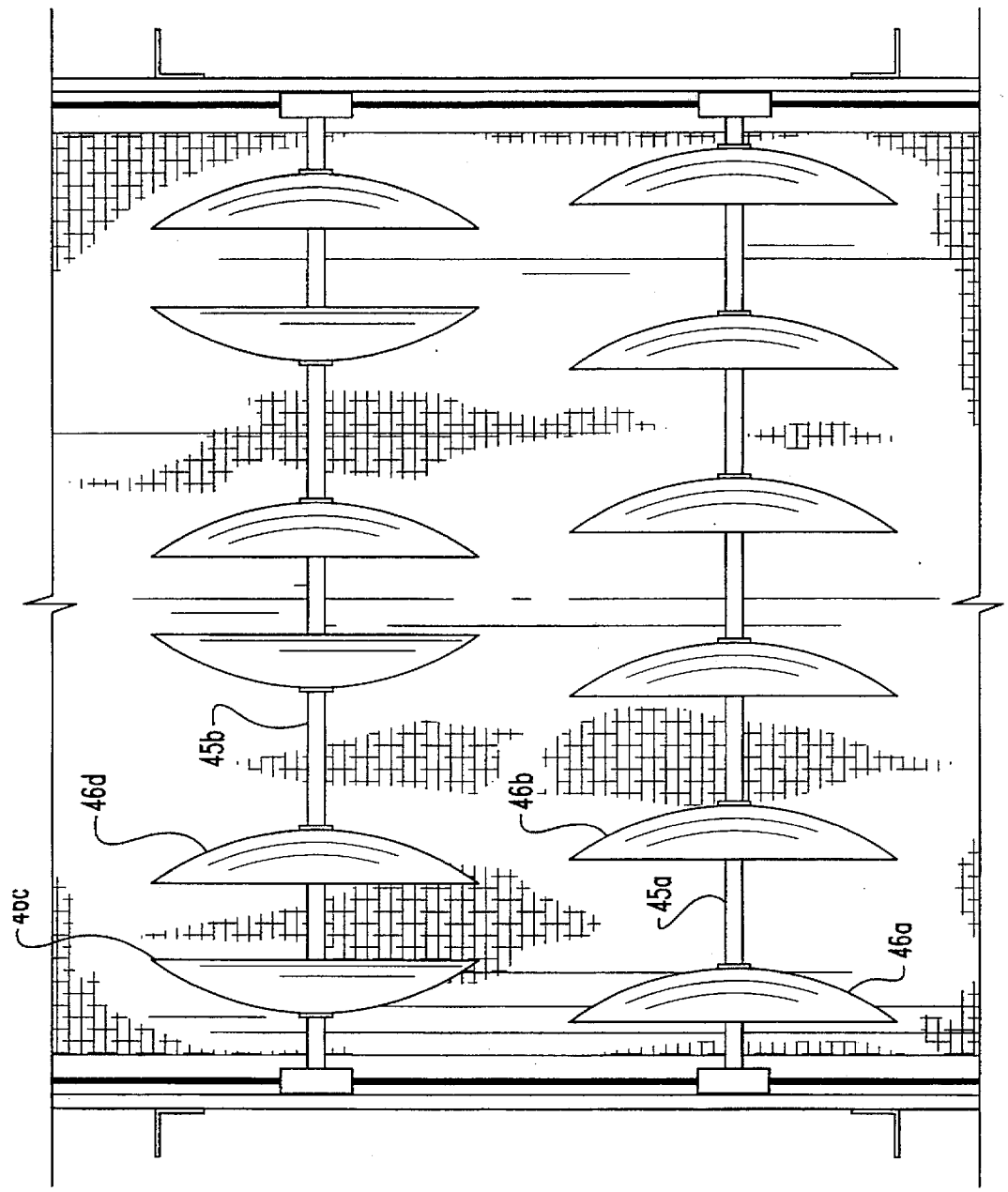
FIG. 3 is a top plan view of a plowing device comprising a portion of one embodiment of the present invention.
Figure 4:
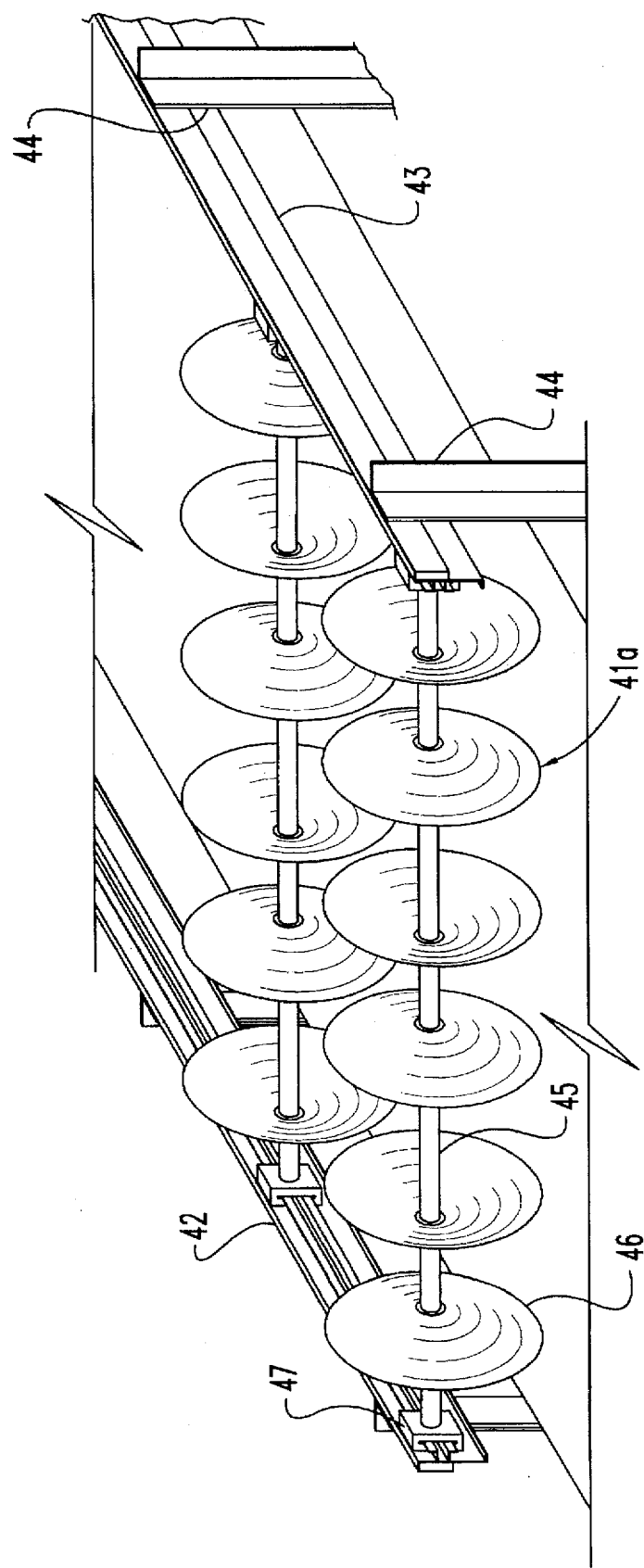
FIG. 4 is a perspective view of the FIG. 3 plowing device.

FIG. 4 is a perspective view of one embodiment of plowing device 41. In this embodiment, plowing device 41a comprises a rod 45 and at least one disc 46 fixedly coupled to rod 45. When there is more than one disc 46 coupled to rod 45, the present invention contemplates that discs 46 may be orientated in a variety of directions and angles on rod 45. With reference to FIG. 3, disc 46a and disc 46b are orientated in the same direction and at the same angle on rod 45a, while disc 46c and 46d are orientated in opposing directions and at the same angle on rod 45b. Further, a plurality of plowing devices 41 can be coupled together or moved in concert to condition the manure to expedite it's drying.

Referring back to FIG. 4, the present invention contemplates that rod 45 is moveably coupled to both first rail 42 and second rail 43 by means that enable discs 46 to cut and drag chicken manure droppings 3 as plowing device 41 travels back and forth along first rail 42 and second rail 43. Preferably, when utilizing discs 46, rod 45 includes a first U-attachment member 47 that slides back and forth along first rail 42 and a second U-attachment member (not shown) that slides back and forth along second rail 43. This will enable discs 46 to uniformly cut and drag chicken manure droppings 3.

Figure 5:
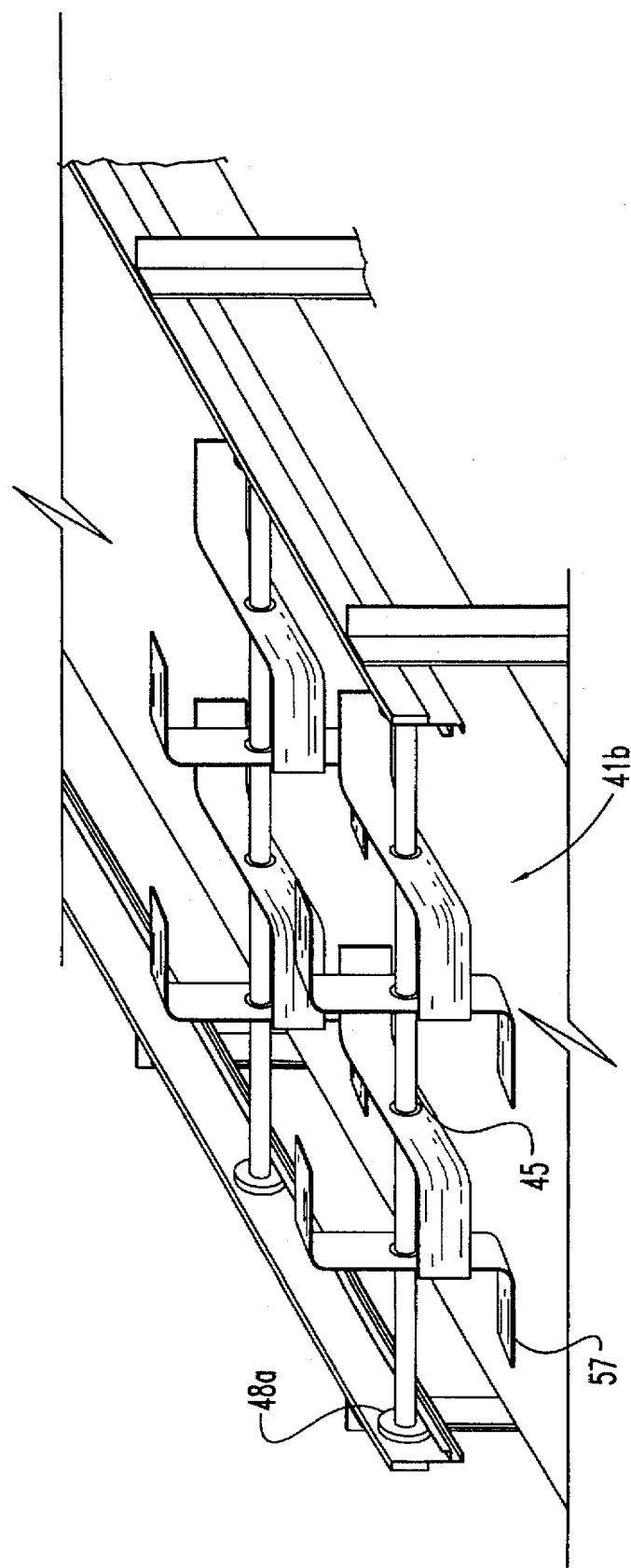
FIG. 5 is a perspective view of another embodiment of a plowing device comprising a portion of the present invention.

FIG. 5 is a perspective view of another embodiment of plowing device 41. In this embodiment, plowing device 41b comprises rod 45 and at least one roto-tiller 57 fixedly coupled to rod 45. In one embodiment a plurality of roto-tillers 57 are coupled to rod 45, however a single roto-tiller 57 coupled to rod 45 is also contemplated herein. When there is more than one roto-tiller 57 on rod 45, the present invention contemplates that the plurality of roto-tillers 57 may be orientated in a variety of directions and angles. The roto-tillers 57 upon movement of rod 45 rotate, thereby rotating the chicken manure droppings 3 so as to expose additional surface area of the manure to the air streams. In the preferred embodiment rod 45 includes a first wheel 48a coupled to first rail 42, and a second wheel 48b coupled to second rail 43 (not illustrated). The wheels 48a and 48b rolling along the respective rails and serve as the means allowing the plowing device 41b to move relative to the rails.

Referring back to FIGS. 1 and 2, platform 20 includes a moveable thin conveyor belt 21. Upon sufficient drying of the chicken manure droppings 3, conveyor belt 21 is rotated to transport the chicken manure droppings 3 to either end of platform 20 where chicken manure droppings may be gathered at a collection site. The conveyor belt 21 is moved at selected time intervals by an auxiliary power source to transport the manure. In one form of the present invention the belt 21 wraps around platform 20 and is coupled to a gear box that is energized intermittently to rotate the belt. The cycling of belt 21 is dependent upon many parameters, however, the inventors have found that rotating the belt every 48 hours provides an adequate drying time.

While the present invention has been illustrated and described in detail in the drawings and foregoing description, the same is to be considered as illustrative and not restrictive in character, it being understood that only the preferred embodiment has been shown and described and that all changes and modifications that come within the spirit of the present invention are desired to be protected.

What is claimed is:

1. A chicken manure drying apparatus, comprising:
   a platform for receiving chicken manure thereon;
   a plowing apparatus positioned over said platform for engaging the chicken manure on said platform; and
   at least one drying fan disposed adjacent to said platform for directing air across said platform.

2. The chicken manure drying apparatus of claim 1, wherein said platform is located under a plurality of chicken cages.

3. The chicken manure drying apparatus of claim 1, wherein said plowing apparatus includes a rod, and at least one disc coupled to said rod.

4. The chicken manure drying apparatus of claim 3, wherein said plowing apparatus further includes a first rail and a second rail and said rod being moveably coupled to said first rail and said second rail.

5. The chicken manure drying apparatus of claim 4, which further includes a moveable belt, said belt positioned upon said platform for receiving the chicken manure therein.

6. The chicken manure drying apparatus of claim 2, wherein said plowing apparatus includes a rod, and at least one roto-tiller coupled to said rod.

7. The chicken manure drying apparatus of claim 6, wherein said plowing apparatus includes a first rail and a second rail, said rod being moveably coupled to said first rail and said second rail, and wherein said chicken manure drying apparatus further includes a belt moveable relative said platform for conveying chicken manure.

8. A chicken manure drying system, comprising:

collecting means for collecting chicken manure;

plowing means for plowing chicken manure, said plowing means being located so as to engage the chicken manure collected by said collecting means;

means for drying the collected chicken manure; and means for conveying chicken manure to a collection site, said means for conveying positioned beneath said plowing means.

9. The chicken manure drying system of claim 8 wherein said means for collecting manure includes a platform disposed under a plurality of chicken cages.

10. The chicken manure drying system of claim 9 wherein said plowing means includes a rod and at least one disc fixedly coupled to said rod.

11. The chicken manure drying system of claim 9 wherein said plowing means includes a rod and at least one roto-tiller fixedly coupled to said rod.

12. The chicken manure drying system of claim 10 wherein said means for drying includes at least one fan.

13. The chicken manure drying system of claim 11, wherein said means for drying includes at least one fan and wherein said means for conveying includes a rotatable belt coupled to said platform.

14. The chicken manure drying system of claim 12, wherein said means for conveying includes a rotatable belt coupled to said platform.

15. A method of drying chicken manure, comprising:

collecting chicken manure droppings;

blowing air across the chicken manure droppings;

periodically plowing the chicken manure so as to change the surface of the chicken manure exposed to said blowing;

conveying the chicken manure droppings after the chicken manure has been sufficiently dried to serve as fertilizer.

16. The method of claim 15, which further includes:

providing a rotatable conveyor belt;

said conveying includes rotating the conveyor belt to move the chicken manure.

17. The method of claim 15, wherein said plowing includes dragging a plowing apparatus through the chicken manure to expose a different portion of the chicken manure to the air.

* * * * *